(12) United States Patent
Andreas-Schott et al.

(10) Patent No.: US 10,374,237 B2
(45) Date of Patent: *Aug. 6, 2019

(54) BIPOLAR PLATE AND FUEL CELL COMPRISING SAME

(71) Applicant: Audi AG, Ingolstadt (DE)

(72) Inventors: Benno Andreas-Schott, Sassenburg/OT Triangel (DE); Markus Ritter, Braunschweig (DE)

(73) Assignee: Audi AG, Ingolstadt (DE)

( * ) Notice: Subject to any disclaimer, the term of this patent is extended or adjusted under 35 U.S.C. 154(b) by 266 days.

This patent is subject to a terminal disclaimer.

(21) Appl. No.: 15/301,287

(22) PCT Filed: Apr. 2, 2015

(86) PCT No.: PCT/EP2015/057345
§ 371 (c)(1),
(2) Date: Sep. 30, 2016

(87) PCT Pub. No.: WO2015/150533
PCT Pub. Date: Oct. 8, 2015

(65) Prior Publication Data
US 2017/0025690 A1    Jan. 26, 2017

(30) Foreign Application Priority Data
Apr. 2, 2014   (DE) .................. 10 2014 206 333

(51) Int. Cl.
*H01M 8/241*    (2016.01)
*H01M 8/0202*   (2016.01)
(Continued)

(52) U.S. Cl.
CPC ..... *H01M 8/04089* (2013.01); *H01M 8/0202* (2013.01); *H01M 8/0258* (2013.01);
(Continued)

(58) Field of Classification Search
CPC ............ H01M 8/04089; H01M 8/241; H01M 8/0202; H01M 8/0267; H01M 8/0258; H01M 8/0247; H01M 2008/1095
See application file for complete search history.

(56) References Cited

U.S. PATENT DOCUMENTS 6,974,648 B2   12/2005   Goebel
7,601,452 B2   10/2009   Goebel
(Continued)

FOREIGN PATENT DOCUMENTS

DE   102008056900   5/2010
JP      5139753      3/2009
(Continued)

*Primary Examiner* — Eugenia Wang
(74) *Attorney, Agent, or Firm* — Davidson, Davidson & Kappel, LLC

(57) ABSTRACT

A bipolar plate for a fuel cell, including a profiled anode plate and a profiled cathode plate each having an active region and two distributor regions with an anode gas main port for feeding and discharging fuel, a cathode gas main port for feeding and discharging oxidation agents, and a coolant main port for feeding and discharging coolant, these being arranged along a side edge. The bipolar plate includes distributor regions including at least one overlap section in which channels intersect one another in a non-fluidically connecting manner. The cathode gas main port is arranged between the anode gas main port and the coolant main port, cathode channels extend linearly from the port at least across the distributor region of the bipolar plate and, in a first overlap section, anode channels, and cathode channels intersect one another and form an angle of between 0° and 90°.

17 Claims, 6 Drawing Sheets

(51) Int. Cl.
    *H01M 8/0247*     (2016.01)
    *H01M 8/0258*     (2016.01)
    *H01M 8/0267*     (2016.01)
    *H01M 8/1018*     (2016.01)
    *H01M 8/04089*     (2016.01)

(52) U.S. Cl.
    CPC ......... *H01M 8/0267* (2013.01); *H01M 8/241* (2013.01); *H01M 8/0247* (2013.01); *H01M 2008/1095* (2013.01)

(56) References Cited

U.S. PATENT DOCUMENTS

| | | | |
|---|---|---|---|
| 7,687,182 B2 | 3/2010 | Goebel et al. | |
| 9,306,227 B2 | 4/2016 | Darling et al. | |
| 2004/0115512 A1* | 6/2004 | Fujii | H01M 8/241 429/434 |
| 2007/0082252 A1* | 4/2007 | Goebel | H01M 8/0258 429/434 |
| 2012/0129073 A1* | 5/2012 | Spencer | H01M 8/0247 429/460 |
| 2015/0333345 A1* | 11/2015 | Hood | H01M 8/0258 429/434 |
| 2016/0118673 A1 | 4/2016 | Andreas-Schott | |

FOREIGN PATENT DOCUMENTS

| | | |
|---|---|---|
| WO | WO03/050905 A2 | 6/2003 |
| WO | WO2009082337 | 7/2009 |
| WO | WO2010114558 A1 | 10/2010 |
| WO | WO2014001842 A1 | 1/2014 |
| WO | WO2014195052 A1 | 12/2014 |

* cited by examiner

BIPOLAR PLATE AND FUEL CELL COMPRISING SAME

The present invention relates to a bipolar plate including a profiled anode plate and a profiled cathode plate, each having two distributor areas for conducting operating media, each having an anode gas main port for the supply and discharge of fuel, a cathode gas main port for the supply and discharge of oxidants, and a coolant main gas port for the supply and discharge of coolant, which are situated along a lateral edge, and an active area between the distributor areas, the plates being situated one over another in such a way that the bipolar plate has channels for the operating media between main gas channel and active area, and a fuel cell including such a bipolar plate.

BACKGROUND

Fuel cells use the chemical reaction of a fuel with oxygen to form water to generate electrical energy. For this purpose, fuel cells contain, as the core component, the so-called membrane-electrode assembly (MEA), which is a composite of a proton-conductive membrane and an electrode arranged on either side on the membrane (anode and cathode). During operation of the fuel cell, the fuel, in particular hydrogen $H_2$ or a hydrogen-containing gas mixture, is supplied to the anode, where an electrochemical oxidation takes place with the emission of electrons ($H_2 \rightarrow 2H^+ + 2e^-$). A (water-bound or water-free) transport of the protons $H^+$ from the anode chamber into the cathode chamber takes place via the membrane, which separates the reaction chambers from one another in a gas-tight manner and electrically insulates them. The electrons provided at the anode are conducted via an electrical line to the cathode. Oxygen or an oxygen-containing gas mixture is supplied to the cathode, so that a reduction of the oxygen takes place with absorption of the electrons ($\frac{1}{2}O_2 + 2e^- \rightarrow O^{2-}$). Simultaneously, these oxygen anions react in the cathode chamber with the protons transported via the membrane to form water ($2H^+ + O^{2-} \rightarrow H_2O$). Due to the direct conversion of chemical energy into electrical energy, fuel cells achieve an improved efficiency in relation to other electricity generators as a result of the avoidance of the Carnot factor. The cathode reaction represents the speed-limiting element of the fuel cell reaction, inter alia, due to the lower diffusion speed of oxygen in relation to hydrogen.

In general, the fuel cell is formed by a plurality of membrane-electrode assemblies arranged in a stack, the electrical powers of which are added together. A bipolar plate is situated between each two membrane-electrode assemblies of a fuel cell stack, which has channels for supplying the process gases to the anode and the cathode of the adjacent membrane electrode assemblies, on the one hand, and also coolant channels for dissipating heat. Bipolar plates additionally include an electrically conductive material to establish the electrical connection. They therefore have the threefold function of the process gas supply of the membrane-electrode assemblies, the cooling, and the electrical connection.

Bipolar plates are known in different designs. Weight reduction, installation space reduction, and increase of the power density represent fundamental goals in the design of bipolar plates. These criteria are important in particular for the mobile use of fuel cells, for example, for the electromotive traction of vehicles.

US 2005/0058864 A1 (U.S. Pat. No. 6,974,648 B2) and US 2006/0029840 A1 (U.S. Pat. No. 7,601,452 B2) describe bipolar plates for fuel cells, which are constructed from two undulated and interleaved plates. Each of the plates has a meandering profile, so that grooves are formed in each case on both sides, which are delimited by wall-like projections. The two plates have different widths of the grooves or projections formed. Closed channels, which are used as cooling channels, are formed in the interleaved microstructure of the plates. The open channels (grooves) provided on both sides of the microstructure face toward the anode on one side and the cathode on the other side of the adjacent MEAs in the assembled fuel cell stack and are used for the supply thereof with air/oxygen or fuel/hydrogen, respectively.

The bipolar plate described in WO 03/050905 A2 has continuous depressions on one side to form anode channels and continuous depressions on the other side to form cathode channels. Furthermore, the plate has enclosed coolant channels. All channels extend in parallel to one another.

SUMMARY OF THE INVENTION

It is an object of the present invention to provide a bipolar plate, the hydraulic cross section of which is optimized in such a way that the pressure loss of the operating media is reduced. In particular, the bipolar plate is to be designed to implement a preferably homogeneous pressure distribution of the operating media across the surface area.

The present invention provides a bipolar plate for a fuel cell, including a profiled anode plate and a profiled cathode plate, each having two distributor areas for conducting operating media, each having an anode gas main port for the supply and discharge of fuel, a cathode gas main port for the supply and discharge of oxidants, and a coolant main port for the supply and discharge of coolant, which are situated along a side edge, i.e., adjacent to one another, the plates being formed and positioned one over another in such a way that the bipolar plate has channels, which connect the operating means main ports of both distributor areas. Furthermore, the distributor areas have at least one overlap section, in which the channels overlap one another in a non-fluidically connected way. It is provided according to the present invention that the cathode gas main port is situated in such a way that cathode channels originating therefrom extend linearly across at least the distributor area of the fuel cell, and anode channels originating from the anode gas main port and the cathode channels overlap one another in a first overlap section and enclose an angle which is between 0° and 90°, i.e., is greater than 0° and less than 90°.

In the present case, openings in the bipolar plate which result in channels for guiding operating media in a fuel cell stack are to be understood as ports.

Channels are understood as open (i.e., grooved) and/or closed (i.e., tubular) fluid connections for the transport of the operating means. They may be formed as discrete channels or also as a flow field, which enables a transverse flow.

A bipolar plate according to the present invention has the advantage in particular that due to the linearity of the cathode channels, a water discharge is promoted and therefore clogging of cathode channels as a result of a water accumulation is largely or completely prevented. Furthermore, the overlap according to the present invention of anode and cathode channels results in an essentially homogeneous distribution of fuel and coolant across the overlap section. This in turn promotes a homogeneous distribution of the pressure of reactant fluids (since these are provided in gaseous form in particular, they are also referred to hereafter as reactant gases) within the cathode channels across the entire area of the bipolar plate.

In the present case, a bipolar plate is divided into three areas including two distributor areas and one active area. A first distributor area is used for the supply of operating media to the active area of the bipolar plate and a second distributor area is used for the removal of the operating media from the active area. Both distributor areas are preferably designed identically, in particular are convertible into one another by mirror symmetry, preferably rotational symmetry. In the distributor areas, the operating means main ports, i.e., anode gas main port, coolant main port, and cathode gas main port, are in turn situated. For example, the main ports may be situated essentially adjacent to one another, along a lateral edge, in particular a short lateral edge of the bipolar plate.

Typically, the operating means main ports are classifiable on the basis of their design, in particular their proportions. Thus, both in the prior art and in the present invention, the cathode gas main port of the three different operating means main ports always has the largest open area, the open area of the anode gas main port, in contrast, is usually configured to be smaller than the areas of cathode gas main port and the coolant main port. The function of the particular operating means main port is thus also uniquely identifiable in the passive state in the present invention.

The active area, which is situated between the two distributor areas, is characterized in that, in the assembled state of the fuel cell stack, this area is opposite an electrode of the membrane-electrode assembly. This means, the chemical reactions, which are the foundation for the energy generation in a fuel cell, take place in the active area.

The operating media in the present case are fluids, i.e., materials present in liquid or gaseous form, which are guided to the plate through the particular operating means main ports via suitable feeds. There are two reactant fluids, in particular a cathode operating means (oxidant) and an anode operating means (fuel), and also a coolant, preferably water. Oxygen is preferably used as the oxidant and hydrogen as the fuel.

According to the present invention, the cathode channels of a bipolar plate extend linearly, or without deflection, i.e., without direction change, across at least the distributor area. This is to be understood in the present case to mean that the cathode channels do not have any turns in a top view of the cathode plate. They are preferably situated in parallel to one another. Such an arrangement is found according to the present invention at least in the distributor area. This arrangement is also preferably continued over the entire length of the bipolar plate, i.e., also in the active area. The linear course of the cathode channels has the advantage that a water accumulation and clogging of the cathode channels accompanying this is prevented by an improvement of the hydraulic cross section in the entire cathode channel area. Furthermore, bipolar plates according to the present invention may be operated using a low-pressure strategy, i.e., an operating means pressure of less than 2 bars.

The cathode gas main port is particularly preferably situated between anode gas main port and coolant main port. This arrangement enables the cathode channels to extend linearly across the entire area of the bipolar plate in a simple way.

The anode channels are formed according to the present invention in such a way that they extend across the entire width of a cathode flow field, the cathode flow field corresponding to the total of all cathode channels. The fuel is thus advantageously supplied to the flow field across the entire width having an essentially equal starting pressure and an inhomogeneous pressure distribution of the fuel is not produced already in the distributor area, as in the conventional construction of a bipolar plate.

The angle between anode channels and cathode channels in the first overlap section is particularly advantageously 10° to 60°. In this way, the length difference of the anode channels within a distributor area is preferably small.

The length of the anode channels may, with the same angle between cathode channels and anode channels, furthermore be influenced by the arrangement of the anode gas main port within the distributor area. Since pressure losses already take place during the transport of the fuel in the channels, a reduction of the length differences of the anode channels in turn results in a more homogeneous pressure distribution of the fuel in the flow field.

The advantage of a homogeneous pressure distribution, in particular across the width of the bipolar plate, may be reinforced in that the cathode gas main port extends across the width of all cathode channels. In addition, it is particularly preferred in one embodiment of the present invention that a width of the bipolar plate be less in the active area than in the distributor area. In particular, the width of the plate in the active area essentially corresponds to the width of the flow field.

In one preferred embodiment of the present invention, it is provided that a main flow direction of the coolant extends transversely in relation to the cathode channels at least in a section of the overlap area. This has the advantage that the coolant is uniformly distributed across the entire width of all cathode channels. In particular, coolant which has nearly the same pressure and the same temperature is applied to the outer edges, i.e., a first and a last cathode channel.

Main flow direction is to be understood as the flow direction of the predominant part of the coolant. This is determined, on the one hand, by the momentum and the inertia of the water, but may be changed and/or redirected, on the other hand, by resistances, for example, transverse webs in the channel structure.

For this purpose, the coolant main port in the distributor area is situated adjacent to the cathode gas main port. In particular, it is situated outside an imaginary extension of the active area within the distributor area. In other words, the coolant main port is preferably located in a part of the distributor area which is located outside the width of the active area.

Proceeding from the coolant main port, coolant channels, which are situated in parallel to one another for the transport of coolant, extend in this embodiment initially in parallel to the cathode channels. Subsequently, the coolant channels are guided in a curved course at an angle of 75° to 95°, preferably an angle of 90°, in the direction of the cathode channels. The coolant channels are preferably formed across the entire bipolar plate as closed channels extending between the two plates. Between the coolant main ports and the overlap area, the coolant channels are preferably formed by grooves of one of the plates, preferably the anode plate, which are pronounced in the direction of their outer surface. With the transition into a first overlap section, the coolant channels result from the negative structure of the cathode and anode channels, namely in the undulated structure on a side of the cathode and anode plate facing away from the electrode side and therefore extend in parallel thereto (see FIG. 4).

The main flow direction of the coolant follows the structure of the coolant channels and is therefore aligned transversely, in relation to the cathode channels in the overlap section, at which the coolant channels and cathode channels overlap one another in a top view of the plate.

In a second overlap section of the distributor area, the cathode channels and the coolant channels advantageously overlap one another in a non-fluidically connected way and extend at an angle of 75° to 100°, preferably orthogonally, in relation to one another. The main flow of the coolant extending transversely to the cathode channels is thus continued across the width of the cathode flow field. This is preferably achieved by coolant channels proceeding from the coolant main port in the profile of the anode plate. In the second overlap section, the coolant therefore runs, on the one hand, in coolant channels extending transversely to the cathode channels, on the other hand, it is guided by the overlap of the channels on the coolant side of the cathode plate in the webs of the cathode channels.

In one preferred embodiment of the present invention, it is provided that in the first overlap section, furthermore the coolant channels proceeding from the coolant main port overlap with the cathode channels and the anode channels. The overlap of the three operating means channels is preferably achieved in that the undulated profile of the anode plate for guiding coolant in the first overlap section merges into the coolant channels, which are formed on the coolant side from the channel webs of the anode and cathode channels.

Therefore, in one embodiment of the present invention, it is preferred that the coolant channels in the second overlap section be formed as anode-side pronounced channels and be formed in the first overlap section as channels extending on the anode and cathode sides between the anode plate and the cathode plate. By way of this arrangement, the height of the coolant channels may be increased while optimizing the hydraulic cross section (i.e., reducing the flow resistances). In addition, the transition of the channel structure in the distributor area to that in the active area is made easier.

It is therefore advantageously provided that in the first overlap section, the coolant channels extend in parallel to the cathode channels.

The coolant channels are particularly advantageously formed in the at least one overlap area in the form of a flow field, which enables transverse flows of the coolant. Since the anode channels extend at an angle to the cathode channels according to the present invention, passages for coolant form at the overlap points of cathode and anode channel webs on the coolant side, so that coolant may flow out of a cooling channel extending in parallel to the cathode channels into a channel extending in parallel to the anode channels. The transverse flow of the coolant to the cathode flow field which is thus optimized results in a uniform coolant distribution having very low pressure loss of the coolant, in particular in the first overlap section.

In another embodiment of the present invention, it is preferred that the cathode channels and the anode channels be situated in parallel one over another in the active area of the bipolar plate. In the active area, anode and cathode channels thus preferably extend congruently one over another, so that the anode channel bottoms are preferably in contact across the entire length of the active area of the bipolar plate with the particular cathode channel bottoms situated opposite and form discrete coolant channels in the resulting interspaces. This has the advantage that the bipolar plate in the active area additionally fulfills the function of support and electrical conduction between the plates. The main flow directions of all operating media are in parallel to one another in the active area in this embodiment.

The channels of the particular reactant fluid are generally formed by the profile of the associated anode and cathode plate. This means, the anode channels are defined by the design of the anode plate, while the cathode channels result from the profile of the cathode plate. The coolant channels result from the associated negative profile of the two. In one preferred embodiment of the present invention, it is preferred that the coolant channels proceeding from the coolant main port be provided in the distributor area on only one of the plates, in particular the anode plate. The counter plate does also delimit the resulting coolant channel, but is formed as planar (non-profiled) in the affected area. The supply of the coolant from the coolant main port up to the overlap with the cathode channels is therefore solely determined by the profile in the cathode plate. Alternatively, it is preferred that such an embodiment of the coolant channels in the distributor area is only located on the cathode plate. These embodiments primarily have a production advantage.

The present invention furthermore relates to a fuel cell, including a stack of a plurality of bipolar plates according to the present invention and a plurality of membrane-electrode assemblies, the bipolar plates and the membrane-electrode assemblies being stacked one over another in alternation.

A fuel cell according to the present invention advantageously includes an optimized pressure distribution having low pressure loss of the operating media, in particular the coolant, across the individual bipolar plates, but also across the entire fuel cell stack.

In one preferred embodiment, at least one clamping element is situated along the fuel cell stack in parallel to the active areas of the bipolar plates between the distributor areas. If, according to one preferred embodiment, a width of the bipolar plate in the active area is less than in the distributor area, lateral recesses result in the stack, within which the at least one clamping element is situated. This has the advantage that the clamping element builds up pressure on the bipolar plates in particular in the active area of the fuel cell, in which the demands on the resulting seal are highest. Furthermore, in this area, a bipolar plate according to the present invention is provided as more stable, so that the pressure applied by the clamping element may be higher than if the clamping element were situated in the distributor area. This increase of the possible maximum pressure in turn has a positive effect on the seal in the active area. The clamping element is designed in particular as a spring packet.

The fuel cell may be used for mobile or stationary applications. In particular, it is used for the power supply of an electric motor for the drive of a vehicle. Therefore, another aspect of the present invention relates to a vehicle which includes a fuel cell according to the present invention.

The various specific embodiments of the present invention mentioned in this application are advantageously combinable with one another, if not stated otherwise in the individual case.

BRIEF DESCRIPTION OF THE DRAWINGS

The present invention is explained hereafter in exemplary embodiments on the basis of the associated drawings.

DETAILED DESCRIPTION

Figure 1:
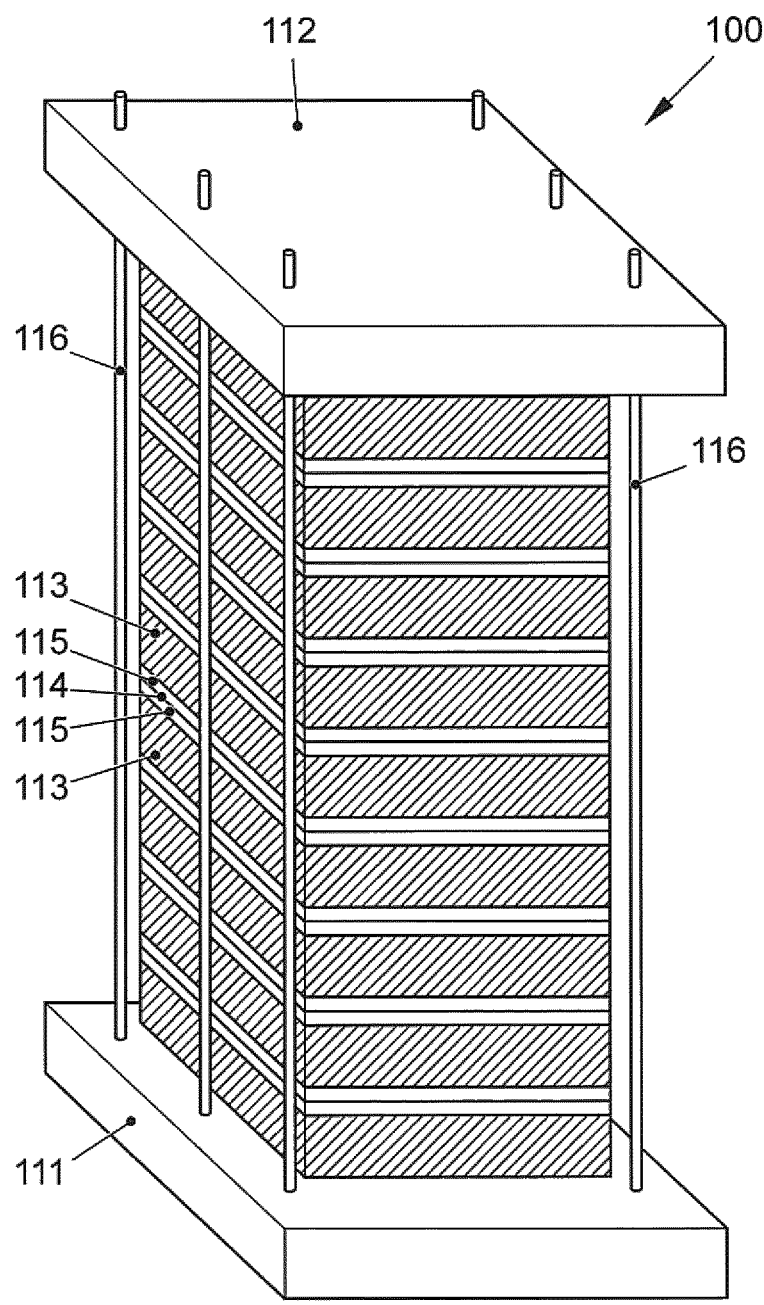
FIG. 1 shows a schematic view of a fuel cell stack.

FIG. 1 shows a fuel cell stack in a schematic view. Fuel cell stack 100 includes a first end plate 111 and a second end plate 112. A plurality of stack elements stacked one over another, which include bipolar plates 113 and membrane-electrode assemblies 114, is situated between end plates 111, 112. Bipolar plates 113 are stacked alternately with membrane-electrode assemblies 114. Membrane-electrode assemblies 114 each include a membrane and electrodes adjoining on both sides of the membrane, namely an anode and a cathode (not shown). Membrane-electrode assemblies 114 may additionally have gas diffusion layers (also not shown) adjoining the membrane. Sealing elements 115, which seal the anode and cathode chambers in a gas-tight manner to the outside, are situated in each case between bipolar plates 113 and membrane-electrode assemblies 114. Fuel cell stack 100 is compressed with the aid of clamping elements 116, for example, draw bars or clamping plates, between end plates 111 and 112.

In FIG. 1, only the narrow sides are visible of bipolar plates 113 and membrane-electrode assemblies 114. The main surfaces of bipolar plates 113 and membrane-electrode assemblies 114 press against one another. The view in FIG. 1 is partially not true to scale. A thickness of a single cell, including a bipolar plate 113 and a membrane-electrode assembly 114, is typically a few millimeters, membrane-electrode assembly 114 being the much thinner component. In addition, the number of the single cells is typically substantially greater than shown.

Figure 2:
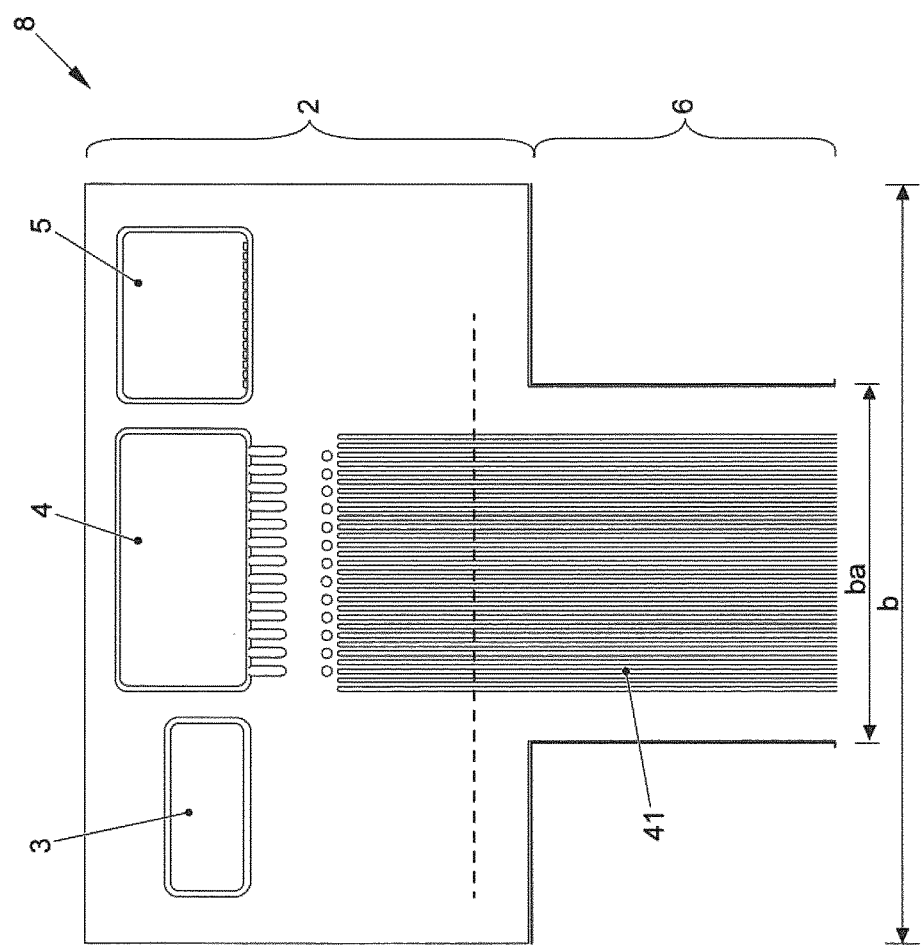
FIG. 2 shows atop view of a detail of a cathode plate of a bipolar plate according to the present invention.

FIG. 2 shows a detail of a cathode plate 8 of a bipolar plate. This detail includes a distributor area 2 and an active area 6. A further distributor area (not shown) adjoins on the opposite side of the active area.

Cathode plate 8 is manufactured from an electrically conductive material, preferably a metallic material. It has a profile to form channels 41, 51 both in active area 6 and also in distributor area 2.

Distributor area 2 has three openings, so-called operating means main ports to form operating means main channels, namely an anode gas main port 3, a cathode gas main port 4, and a coolant main port 5. Operating means main ports 3, 4, and 5 are located adjacent to one another along an edge of cathode plate 8. Anode gas main port 3 has the smallest open area, cathode gas main port 4, which is situated in the middle between anode gas and coolant main ports 3 and 5, has the largest open area, while coolant main port 5 has an open area which is larger than that of anode gas main port 3 and smaller than that of cathode gas main port 4. Cathode channels 41 are formed as grooved, i.e., as open channels, by a corresponding profile of plate 8.

Proceeding from cathode gas main port 4, cathode channels 41 extend linearly, i.e., essentially linearly without turns, curves, or hairpin bends, across distributor area 2 and active area 6. The width of all cathode channels 41, which are situated adjacent to one another and in parallel, essentially corresponds in total to the width of cathode gas main port 4.

The undulated profile may be manufactured in particular by stamping in a suitable stamping tool proceeding from a planar plate.

Furthermore, cathode plate 8 has, in the embodiment shown, a width $b_a$ in active area 6 which is less than a width b of the bipolar plate in distributor area 2. A recess of the plate results in a middle area of a length of the plate. Width b of distributor area 2 preferably corresponds to the total width of the bipolar plate.

Figure 3:
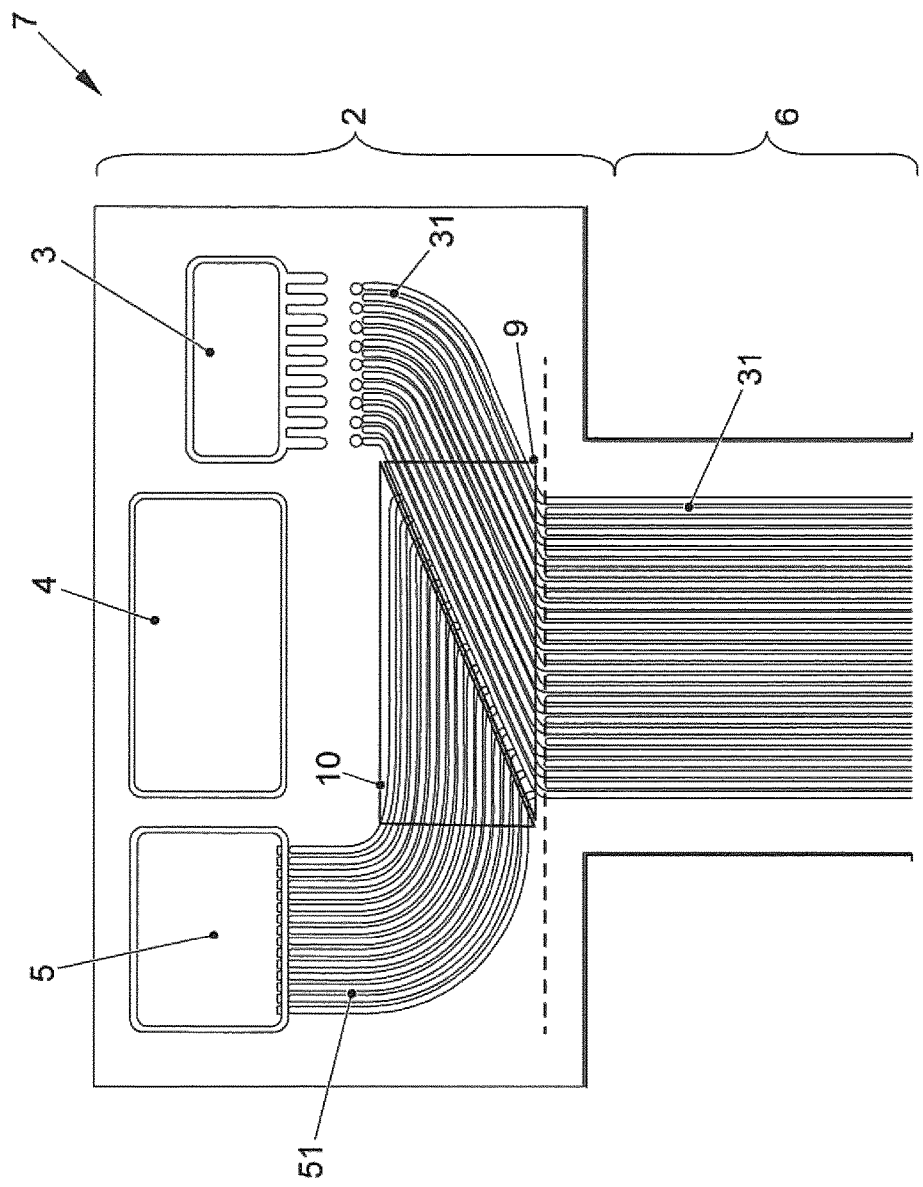
FIG. 3 shows a top view of a detail of an anode plate of a bipolar plate according to the present invention in a preferred embodiment.

FIG. 3 shows an anode plate 7, which represents the counterpart of cathode plate 8 shown in FIG. 2 for forming a shared bipolar plate 1. In other words, FIG. 3 shows the rear side of the bipolar plate from FIG. 2. Anode plate 7 is also only shown in a detail in FIG. 3, which may be divided into a distributor area 2 and an active area 6. Distributor area 2 has openings for coolant main port 5, cathode gas main port 4, and anode gas main port 3. These are provided in shape, size, and arrangement corresponding to operating means main ports 3, 4, and 5 of cathode plate 8 shown in FIG. 2. The mirrored arrangement of the channels (coolant channel on the outside right in FIG. 2, coolant channel 5 on the outside left in FIG. 3) is caused because, to form a shared bipolar plate 1, anode plate 7 and cathode plate 8 are applied to one another in such a way that the sides concealed in each of the figures face toward one another, so that coolant may be guided in the interspaces formed by the structure.

Anode channels 31 proceeding from anode gas main port 3 are situated in parallel to one another and extend, in particular in a first overlap section 9, at an angle of 0° to 90°, in particular 10° to 60°, in relation to coolant channels 51 across distributor area 2.

Coolant channels 51 proceeding from coolant main gas channel 5 extend in parallel to one another and initially in parallel to a side of anode plate 7 which is adjacent to the side along which operating means main ports 3, 4, and 5 are situated. Proceeding from this, they describe a curve, to subsequently extend perpendicularly in relation to the described side in a second overlap section 10.

First section 9 and second section 10 each have the shape of triangles, in particular right triangles, which do not overlap.

Plates 7 and 8 are manufactured from an electrically conductive material, for example, a metal or a carbon-based material or a composite material made of such materials.

Figure 4:
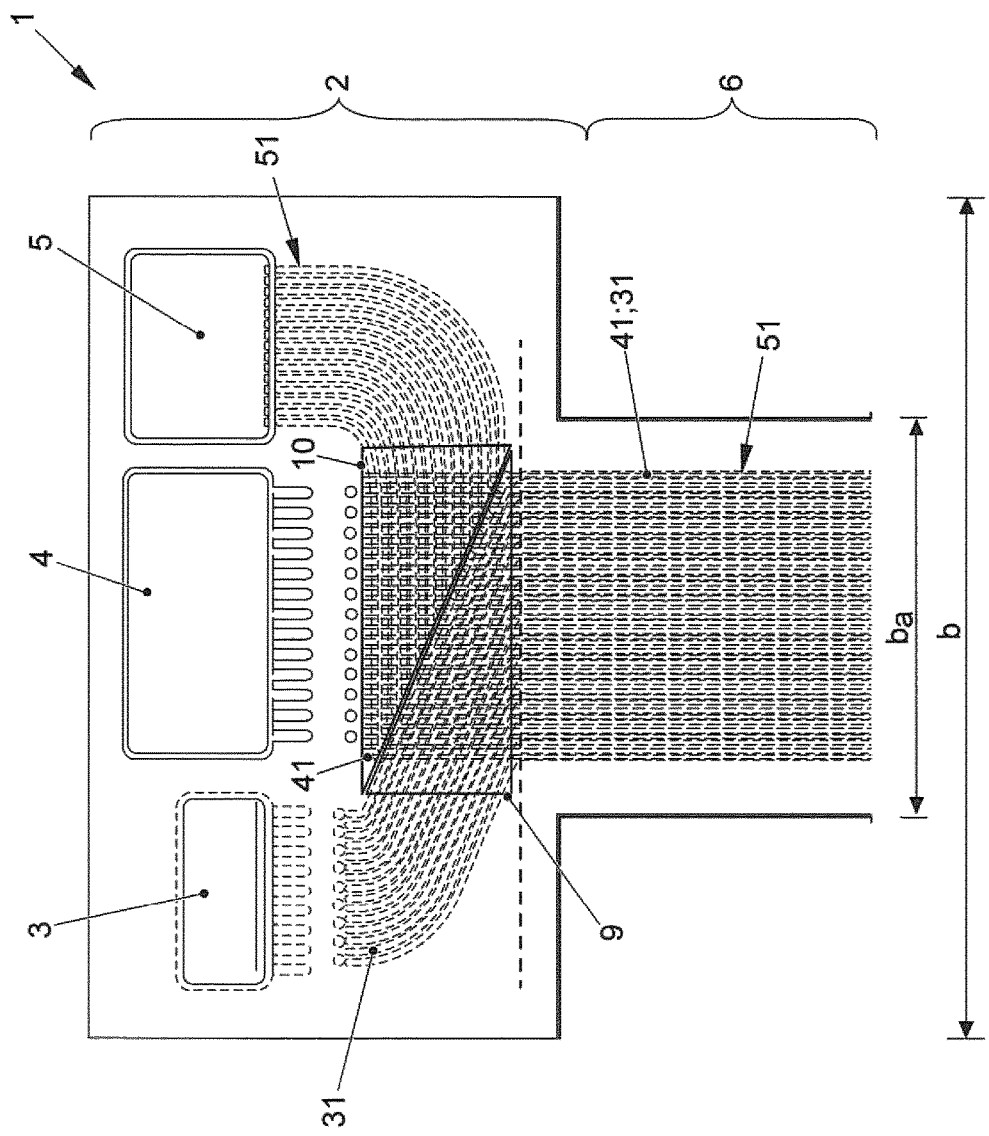
FIG. 4 shows a top view of a detail of a bipolar plate according to the present invention in a preferred embodiment in a wireframe model.

FIG. 4 shows a bipolar plate 1 according to the present invention, which was obtained by joining cathode plate 8 according to FIG. 2 and anode plate 7 according to FIG. 3. The selected top view shows cathode plate 8 in such a way that, of the anode plate, which is located underneath and is actually not visible, only anode channels 31 and coolant channels 51 are indicated by interrupted lines, to illustrate the relative arrangement of the two plates 7, 8.

It is apparent that the two plates 7, 8 are situated one over another and joined to one another in such a way that first anode channels 31 of anode plate 7 in active area 6 rest on cathode channels 41 of cathode plate 8. In this way, continuous coolant channels 51 are formed between plates 7, 8.

First section 9 is formed in such a way that the fuel is distributed uniformly across all cathode channels 41. A first outer anode channel 31 meets a first outer cathode channel 41. A last anode channel 31 (the inner one here), in contrast, extends across the width of the entirety of cathode channels 41, to meet a last cathode channel 41 at the boundary to active area 6. The further channels between first and last cathode channel display a corresponding profile.

At the boundary between first overlap section 9 and active area 6, anode channels 31 extend in a curve and are preferably situated directly above cathode channels 41 in active area 6, as described.

The embodiment of cathode channels 41 as a linearly extending flow field has the result that no water (or at least an amount significantly reduced in relation to the related art)

collects inside the channels and therefore clogging of cathode channels 41 and pressure loss of the oxidant do not occur across the surface area.

The individual channel heights may be enlarged and therefore the hydraulic cross section may be improved in particular by the arrangement of anode channels 31 and coolant channels 51 inside the third section.

The lesser width of bipolar plate 1 according to the present invention in active area 6 is used, in a modification of the arrangement shown in FIG. 1, for example, for accommodating a clamping element. The design of clamping element 116 as a spring packet is particularly preferred for this purpose. The arrangement of clamping element 116 in active area 6 of bipolar plate 1 enables a targeted distribution of pressure and therefore targeted sealing of the cells.

In the distributor area, two plates 7 and 8 rest on one another in such a way that first overlap section 9 results from the superposition of anode channels 31, cathode channels 41, and coolant channels 51, and second overlap section 10 results from the superposition of coolant channels 51 and cathode channels 41.

Figure 4A:
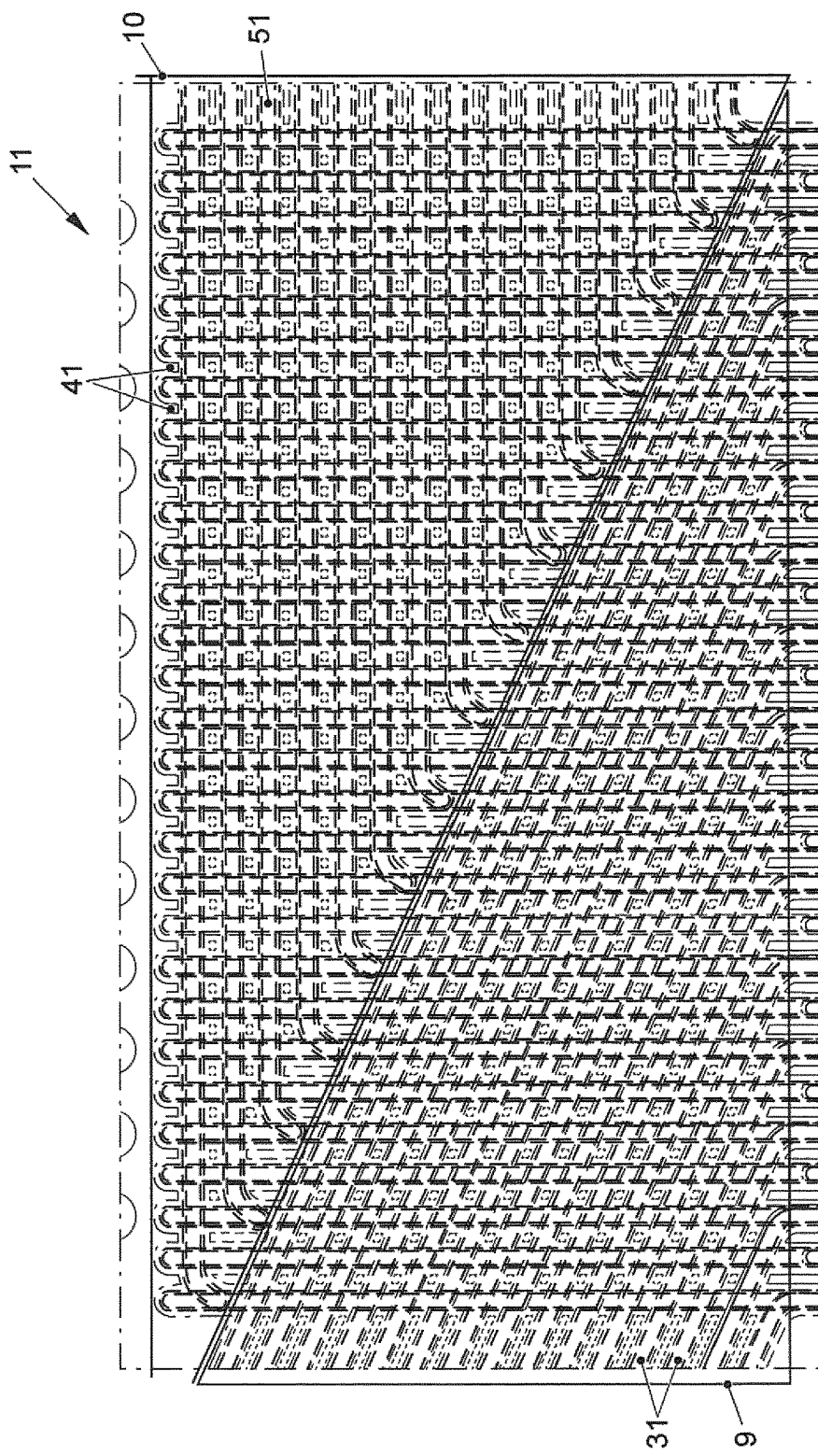

A section 11 resulting from the total of first and second overlap sections 9, 10 is shown as a transparent detail illustration in FIG. 4A. It is shown that cathode channels 41 enclose an angle, preferably between 10° and 60°, with anode channels 31 in first section 9. A right angle results between cathode channels 41 and coolant channels 51 in second section 10.

Figure 5:
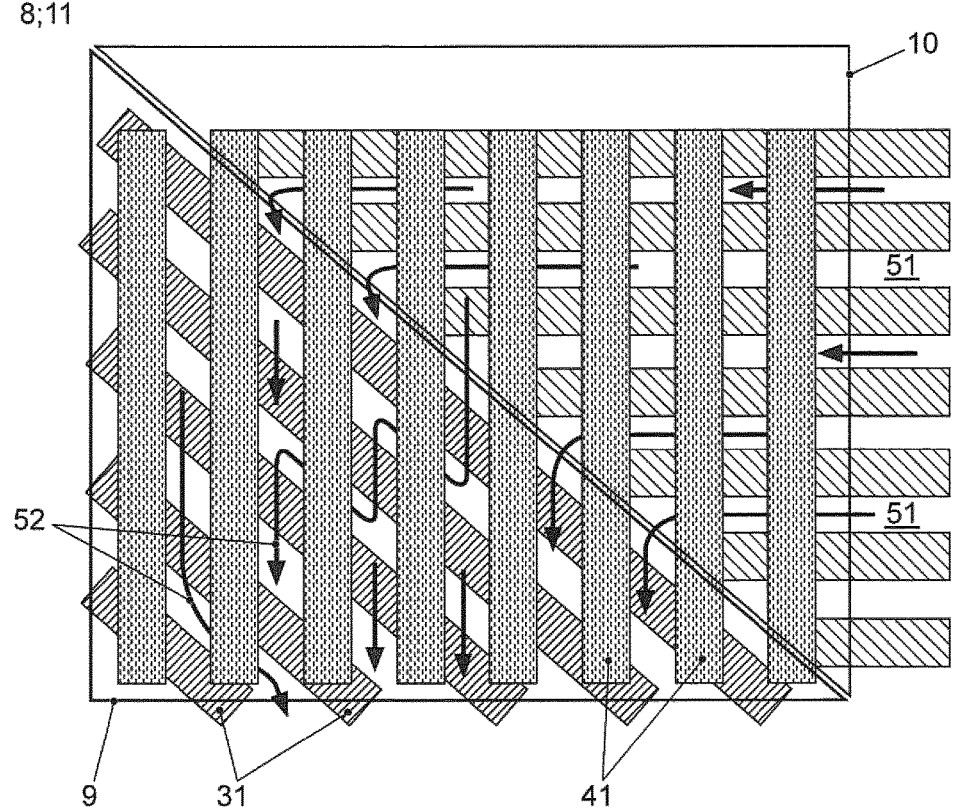
FIG. 5 shows a schematic view of an overlap section of a distributor area of a bipolar plate according to the present invention in a preferred embodiment.

The flow pattern outlined in FIG. 5 results for coolant 52 due to the superposition of the undulated profiles of the two plates 7 and 8. Coolant 52 is guided via coolant channels 51, which are formed in second overlap section 10 by the undulated profile in anode plate 7. A main flow direction of coolant 52 extends transversely, in particular orthogonally, in relation to cathode channels 41 in this section.

Coolant channels 51 superpose the profile of cathode channels 41 initially in second section 10. The possibility results here for coolant 52 to continue to flow transversely and additionally in parallel in relation to cathode channels 41, namely in the waves thereof, which form, on the one hand, the channel webs of cathode channels 41 and, on the other hand, on the inner side of the bipolar plate, channel bottoms for coolant channels 51. To achieve a distribution of coolant 52 across the entire width of cathode channels 41, at least one coolant channel 51 leads across all cathode channels 41.

Coolant channels 51 of the profile of anode plate 7 end at the boundary between first section 9 and second section 10. A transverse flow of the coolant is nonetheless still possible. This results in first section 9 from the negative profile of anode channels 31 in conjunction with that of cathode channels 41.

The specific embodiments shown have the function in particular of moving the fluids, i.e., reactant gases and coolant 52, via operating means main ports 3, 4, and 5 onto or between plates 7 and 8. Proceeding therefrom, they are guided via particular channels 31, 41, and 51 across distributor area 2 and active area 6.

LIST OF REFERENCE NUMERALS 1 bipolar plate
2 distributor area
3 anode gas main port
4 cathode gas main port
5 coolant main gas port
6 active area
7 anode plate
8 cathode plate
9 first overlap section
10 second overlap section
31 anode channels
41 cathode channels
51 coolant channels
52 coolant
100 fuel cell
111 first end plate
112 second end plate
113 bipolar plate (prior art)
114 membrane-electrode assembly
115 sealing element
116 clamping element

The invention claimed is:

1. A bipolar plate for a fuel cell comprising:
a profiled anode plate and a profiled cathode plate, each having an active area and two distributor areas for supply or removal of operating media to or from, respectively, the active area, the distributor areas each having an anode gas main port for supply or discharge of fuel, a cathode gas main port for supply or discharge of oxidants, and a coolant main port for supply or discharge of coolant, the anode and cathode plates being formed and situated one over another in such a way that the bipolar plate has channels for the operating media, the channels connecting the anode gas main port, the cathode gas main port and the coolant main port of both distributor areas to one another, and the distributor areas having at least one overlap section, the channels overlapping one another in a non-fluidically connected manner in the at least one overlap section,
the cathode gas main port being situated in such a way that cathode channels of the channels proceeding from the cathode gas main port extend linearly at least across one of the distributor areas of the bipolar plate and into the active area, and, in a first overlap section of the at least one overlap section, anode channels of the channels proceeding from the anode gas main port and the cathode channels overlap one another and enclose an angle between 0° and 90°.

2. The bipolar plate as recited in claim 1 wherein the cathode gas main port is situated between the anode gas main port and the coolant main port.

3. The bipolar plate as recited in claim 1 wherein the angle between the anode channels and the cathode channels in the first overlap section is 10° to 60°.

4. The bipolar plate as recited in claim 1 wherein in the first overlap section, coolant channels proceeding from the coolant main port overlap with the cathode channels and the anode channels.

5. The bipolar plate as recited in claim 4 wherein in the at least one overlap section, the coolant channels enable transverse flows of the coolant.

6. The bipolar plate as recited in claim 1 wherein in a second overlap section of the at least one overlap section, the cathode channels and coolant channels overlap one another in a non-fluidically connected manner and extend at an angle of 75° to 100° in relation to one another.

7. The bipolar plate as recited in claim 1 wherein the cathode channels in first and second overlap sections of the at least one overlap section are formed as open channels on a cathode side and the anode channels in the first and second overlap sections are formed as open channels on an anode side.

8. The bipolar plate as recited in claim 1 wherein a width of the bipolar plate is less in the active area than in the distributor area.

9. A fuel cell comprising:
a stack of a plurality of the bipolar plates as recited in claim 1;
a plurality of membrane-electrode assemblies, the bipolar plates and the membrane-electrode assemblies being stacked alternately one over another.

10. The bipolar plate as recited in claim 1 wherein coolant from a coolant channel proceeding from the coolant main port can flow both transversely and additionally in parallel to the cathode channels.

11. A bipolar plate for a fuel cell comprising:
a profiled anode plate and a profiled cathode plate, each having an active area and two distributor areas for supply or removal of operating media to or from, respectively, the active area, the distributor areas each having an anode gas main port for supply or discharge of fuel, a cathode gas main port for supply or discharge of oxidants, and a coolant main port for supply or discharge of coolant, the anode and cathode plates being formed and situated one over another in such a way that the bipolar plate has channels for the operating media, the channels connecting the anode gas main port, the cathode gas main port and the coolant main port of both distributor areas to one another, and the distributor areas having at least one overlap section, the channels overlapping one another in a non-fluidically connected manner in the at least one overlap section,
the cathode gas main port being situated in such a way that cathode channels of the channels proceeding from the cathode gas main port extend linearly at least across one of the distributor areas of the bipolar plate, and, in a first overlap section of the at least one overlap section, anode channels of the channels proceeding from the anode gas main port and the cathode channels overlap one another and enclose an angle between 0° and 90°, wherein the cathode gas main port is situated between the anode gas main port and the coolant main port and wherein the angle between the anode channels and the cathode channels in the first overlap section is 10° to 60°.

12. The bipolar plate as recited in claim 11 wherein in the first overlap section, coolant channels proceeding from the coolant main port overlap with the cathode channels and the anode channels.

13. The bipolar plate as recited in claim 12 wherein in the at least one overlap section, the coolant channels enable transverse flows of the coolant.

14. The bipolar plate as recited in claim 11 wherein in a second overlap section of the at least one overlap section, the cathode channels and coolant channels overlap one another in a non-fluidically connected manner and extend at an angle of 75° to 100° in relation to one another.

15. The bipolar plate as recited in claim 11 wherein a width of the bipolar plate is less in the active area than in the distributor area.

16. A fuel cell comprising:
a stack of a plurality of the bipolar plates as recited in claim 11;
a plurality of membrane-electrode assemblies, the bipolar plates and the membrane-electrode assemblies being stacked alternately one over another.

17. The bipolar plate as recited in claim 11 wherein coolant from a coolant channel proceeding from the coolant main port can flow both transversely and additionally in parallel to the cathode channels.

* * * * *